United States Patent [19]

Roe

[11] Patent Number: 5,363,809
[45] Date of Patent: Nov. 15, 1994

[54] PET SANITATION ARTICLE ATTACHABLE TO A LEASH ASSEMBLY

[76] Inventor: Frances L. Roe, 4166 Oregon St., San Diego, Calif. 92104

[21] Appl. No.: 199,496

[22] Filed: Feb. 22, 1994

[51] Int. Cl.⁵ .................. A01K 23/00; A01K 27/00
[52] U.S. Cl. .................... 119/792; 119/858; 294/1.3; 383/907
[58] Field of Search ............ 119/792, 793, 795, 858, 119/95, 174, 161; 294/1.3, 1.4, 1.5; 383/907, 37

[56] References Cited

U.S. PATENT DOCUMENTS 4,630,312 12/1986 Milstein .................. 383/907

FOREIGN PATENT DOCUMENTS 2055507 5/1993 Canada ................... 119/858
2504354 10/1982 France .................... 119/95
2904289 8/1980 Germany .................. 294/1.3

Primary Examiner—Gene Mancene
Assistant Examiner—Todd E. Manahan
Attorney, Agent, or Firm—Baker, Maxham, Jester & Meador

[57] ABSTRACT

A concealed pet waste disposal bag carrier appears as a decorative bow when attached to a pet collar. The carrier includes two pouches each of which carries several plastic bags, each plastic bag being adapted for the sanitary retrieval and disposal of pet waste. Because the carrier is adapted for permanent attachment to the pet leash or collar, sanitary disposal bags are always available for use without planning and without embarrassment.

6 Claims, 1 Drawing Sheet

PET SANITATION ARTICLE ATTACHABLE TO A LEASH ASSEMBLY

BACKGROUND OF THE INVENTION

1. Field of the Invention

This invention relates generally to articles for pet sanitation and specifically to a concealed pet waste disposal bag carrier affixed to a pet collar.

2. Discussion of the Related Art

It has been said that the American population is outnumbered by their pets. We are arguably outnumbered by our pet dogs alone, which number more than 250,000,000 by some estimates. As these numbers increase, the public demand for animal regulation increases correspondingly, responsive to the public health and safety concerns related to the high population of pet animals.

Generally, pet owners residing in a municipal region are subject to ordinances requiring that their animals be leashed at all times in public and otherwise restrained in private to prevent uncontrolled wandering. More recently, some municipalities have promulgated so-called "pooper-scooper" ordinances, which require pet owners to accept personal responsibility for collection and disposition of the waste material produced by their pet animals. These ordinances generally regulate the ownership of dogs but are sometimes explicitly applied to other common pets. Present trends suggest that the owners of pet cats, which are even more numerous than dogs, may someday be subject to "leash-law" and "pooper-scooper" regulations, although progress of such regulations is slowed by the general recognition that pet cats are less subject to owner control and may present less of a public-health hazard and nuisance than do pet dogs.

When pet owners are subject to both leash-law and pooper-scooper ordinances, the owner is obliged to (a) "walk" his pet on a leash and (b) retrieve and dispose of pet wastes when and where the animal decides to relieve itself. This distasteful but mandatory routine is familiar to all responsible dog owners and to many bystanders. Because of the distastefulness of this routine, some practitioners in the art have offered proposals designed to minimize such unpleasantness.

For instance, the term "pooper-scooper" denominates a mechanical apparatus well-known in the art for retrieving solid dog wastes without soiling the owner's hands. Unfortunately, the pooper-scooper is a large and awkwardly-configured device that is used only for its single purpose. Thus, unless the pet-owner plans to use the pooper-scooper, he is unlikely to have it available for use when needed. Because the device is unlikely to be casually carried about by the pedestrian as a normal complement of a pleasure walk.

Accordingly, pet-owners (and others) are often confronted with unplanned pet waste, having available only their hands and whatever devices may be afforded by their immediate environment. Human nature being what it is, such unplanned pet waste is commonly left where it lies, creating social, public-health and legal problems for the pet owner and others.

Other practitioners and pet owners have employed either plastic bags, disposable surgical gloves, sandwich bags, paper tissues, paper bags or the like to handle this unpleasant pet sanitation task. None of these alternatives solve the problem of unplanned pet waste because none of these items is included in the normal pedestrian accoutrement. The typical pedestrian embarking on a walk for pleasure does not normally carry along assorted bags, disposable surgical gloves and the like unless planning to clean up after his pet.

Even with foresight, the thoughtful pet owner often finds it inconvenient to bring along a plastic bag or other similar article when walking a pet. Moreover, a pet walker with a bag in hand, provides a mildly embarrassing spectacle to other pedestrians, whether the bag is empty or not. Although a public display of the actual cleanup of pet waste may elicit public approval, the mere act of awkwardly holding a plastic bag while walking one's dog is less rewarding.

Accordingly, there is a need in the art for a pet sanitation article that solves these problems of (a) unavailability, (b) awkwardness and inconvenience, and (c) the distastefulness associated with retrieving and disposing of pet waste. These unresolved problems and deficiencies are clearly felt in the art and are solved by my invention in the manner described below.

SUMMARY OF THE INVENTION

My invention solves the above problems by providing several disposable waterproof bags in a concealed two-sided pouch that is permanently coupled to the pet leash.

It is an object of my invention to provide a sanitary means for retrieving and disposing of pet waste that is always available for unplanned use. It is an advantage of my invention that several disposable waterproof disposal bags are always made readily available and accessible with the pet when leashed.

It is another object of my invention to conceal the functionality thereof, thereby avoiding unnecessary embarrassment before use. It is a feature of my invention that the two-sided pouch is configured to appear upon close inspection as a "doggie bow-tie" when attached to the pet leash or collar.

It is yet another object of my invention to permit immediate disposal of retrieved pet waste without obliging the pet owner to retain it for the remainder of the outing. It is another feature of my invention that the waterproof bags may be disposable, thereby inviting immediate sanitary disposition of the retrieved pet waste at the first opportunity.

The foregoing, together with other objects, features and advantages of my invention, will become more apparent when referring to the following specification, claims and the accompanying drawing.

BRIEF DESCRIPTION OF THE DRAWING

For a more complete understanding of my invention, I now refer to the following detailed description of the embodiments as illustrated in the accompanying drawing, wherein.

DETAILED DESCRIPTION OF THE PREFERRED EMBODIMENTS

Figure 1:
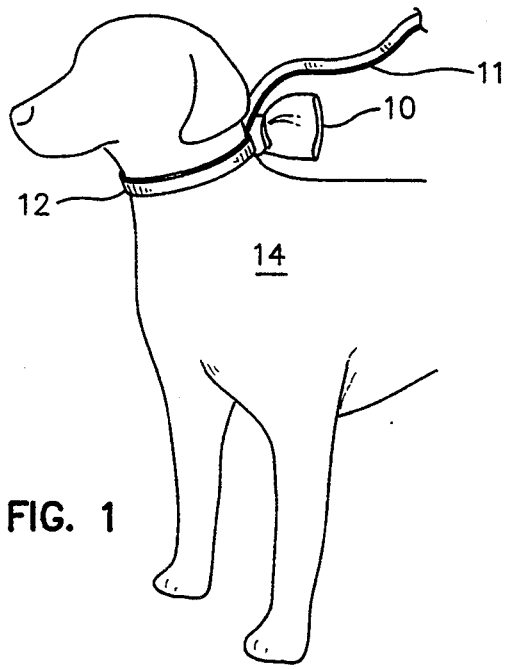
FIG. 1 shows an exemplary disposition of my invention on a pet dog.

FIG. 1 shows the bag carrier 10 of my invention as it appears when fastened in an exemplary position to a pet leash 11 coupled to a pet collar 12, which is in turn fastened about the neck of a pet dog 14. To the casual observer, bag carrier 10 appears to be a decorative bow having no obvious utility.

Figure 2:
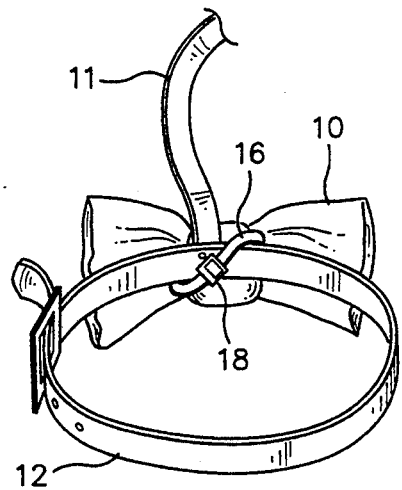
FIG. 2 illustrates the coupling of my invention to a pet leash and/or collar.

FIG. 2 shows additional details of the attachment of bag carrier 10 to pet collar 12. Preferably, a self-locking plastic strap 16 is interlaced through the knotted portion of carrier 10 and around pet leash 11 or, as shown, pet collar 12. Self-locking strap 16 is preferably of the type having a slotted end 18 through which the other end (not shown) is threaded. A metallic tooth (not shown) within slot 18 grips the other end after threading so that it may not be withdrawn. Thus, self-locking strap 16 permanently fastens bag carrier 10 to pet leash 11 or collar 12, thereby ensuring its permanent presence. My invention should be attached to the pet leash assembly that includes a collar or halter for use with pets when leashed.

Figure 3:
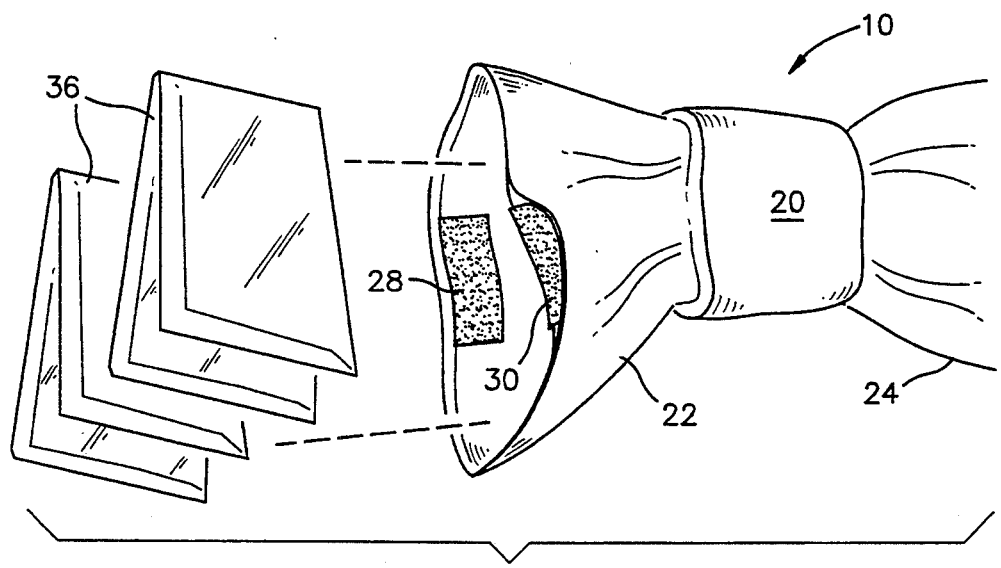
FIG. 3 illustrates the storage and retrieval of the plurality of folded waterproof disposal bags in one of the two pouches of my invention.

FIG. 3 shows additional details of bag carrier 10, including the middle portion with a knot 20 and the two end portions that form the two pouches 22 and 24. Bag carrier 10 is preferably fabricated by first forming the substantially hollow sheath 26 shown in FIG. 4. I prefer to fabricate sheath 26 by sewing the two opposing edges of a flat piece of textile such as a patterned cotton or nylon cloth. Knot 20 (FIG. 3) is then formed merely by interlacing the two ends of sheath 26 and pulling firmly to form a simple knot in the middle region substantially as shown.

Figure 4:
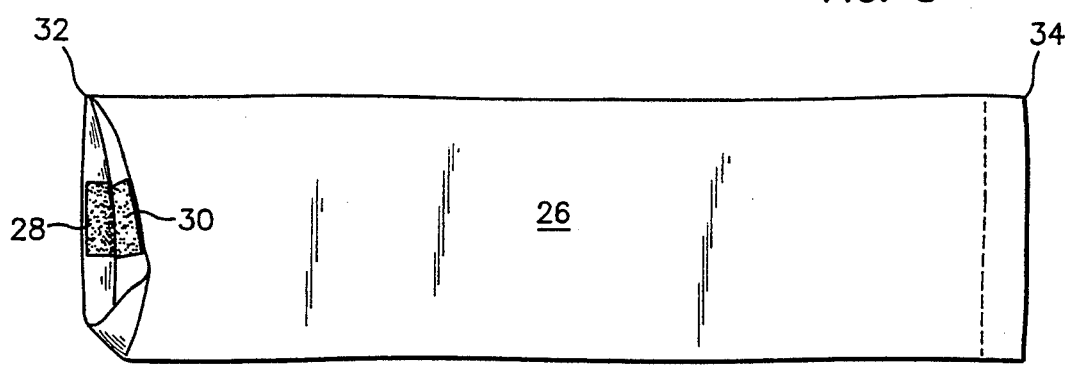
FIG. 4 is a view of the fabric sheath of my invention before knotting to form the two-sided bag carrier of FIGS. 1–3.

Referring to FIG. 4, after forming sheath 26, several pieces of special nylon fabric, exemplified by pieces 28 and 30, are then attached to the inside edges of each of the two ends 32 and 34. Fabric pieces 28 and 30 are fastened so that they oppose each other when the edges at end 32 are forced together. Nylon fabric piece 28 must be of a first type and nylon fabric piece 30 must be of a second type such that pieces 28 and 30 interlock and grip one another in a well-known manner when forced together. For instance, nylon fabric piece 28 may be of a type consisting essentially of a dense uncut pile and nylon fabric piece 30 may be of another type consisting essentially of an array of tiny hooks such that the hooks in piece 30 become entangled with the uncut pile loops in piece 28 when forced into contact. These entangling properties result in pieces 28 and 30 firmly gripping one another when pressed together, but not so firmly that they cannot be separated by some force.

After fastening the pieces of nylon fabric to both ends 32 and 34 of sheath 26 in the manner discussed above, sheath 26 is then knotted to form knot 20 substantially in the central region, thereby creating the two pouches 22 and 24 as shown in FIG. 3. Pouch 22 is then opened by pulling to separate pieces 28 and 30 and filled with several collapsed plastic bags, exemplified by the collapsed plastic bag 36 shown in FIG. 3. Following insertion of the collapsed plastic bags into pouch 22, nylon fabric pieces 28 and 30 are pressed together, thereby sealing pouch 22 and preserving therein the contents until removed for use upon forcing pieces 28 and 30 apart again. Pouch 24 is used in the same fashion as pouch 22.

Collapsed plastic bag 36 preferably is sufficiently water resistant and gas resistant to permit the sanitary retrieval and storage of pet wastes without soiling the hand and without presenting a public nuisance or health hazard after the bagged contents are placed in a refuse container. Paper or tissue bags are not generally suitable for use with my invention unless they are properly waterproofed by some suitable means.

It can be appreciated that the only inconvenient feature of my invention is the necessity to replenish the plastic bags exemplified by plastic bag 36 after several outings. My invention is affixed to the leash assembly (FIG. 2) used to walk the pet, thereby being always available when needed, even for an uncollared pet. All other problems discussed above are solved by my invention in the manner described. Clearly, other embodiments and modifications of my invention will occur readily to those of ordinary skill in the art in view of these teachings. Therefore, my invention is to be limited only by the following claims, which include all such embodiments and modifications when viewed in conjunction with the above specification and accompanying drawing.

I claim:

1. An article for pet sanitation comprising:
    a piece of fabric joined at the edges to form a substantially hollow sheath having two ends, each end opening into the interior of said sheath;
    said ends being looped and interlaced to form at each said end a pouch joined to a central knot;
    each said end having interlocking pieces of nylon fabric including a first said piece consisting essentially of a dense uncut pile in opposition with a second said piece consisting essentially of an array of tiny hooks such that said interlocking pieces of nylon fabric hold firmly to one another when pressed together, thereby holding closed said pouch at said each end.

2. The article of claim 1 further comprising:
    a self-locking strap disposed in interlacing relationship to said central knot and further disposed around a leash assembly to slidingly couple said article to said leash assembly.

3. The article of claim 2 further comprising:
    one or more collapsed plastic bags removably disposed within each said pouch, each said plastic bag including a water-resistant material adapted for the sanitary storage and disposal of pet waste.

4. The article of claim 3 wherein said pet leash assembly comprises a leash connected to a collar for removable attachment about the neck of a pet.

5. The article of claim 2 wherein said pet leash assembly comprises a leash connected to a collar for removable attachment about the neck of a pet.

6. The article of claim 1 further comprising:
    one or more collapsed plastic bags removably disposed within each said pouch, each said plastic bag including a water-resistant material adapted for the sanitary storage and disposal of pet waste.

* * * * *